(12) United States Patent
Forster

(10) Patent No.: US 7,697,946 B2
(45) Date of Patent: Apr. 13, 2010

(54) REFLECTIVE COMMUNICATION USING RADIO-FREQUENCY DEVICES

(76) Inventor: Ian J. Forster, 31 Great Cob, Chelmsford, Essex (GB) CM1 6LA ( * ) Notice: Subject to any disclaimer, the term of this patent is extended or adjusted under 35 U.S.C. 154(b) by 431 days.

(21) Appl. No.: 10/423,824

(22) Filed: Apr. 25, 2003

(65) Prior Publication Data

US 2004/0043747 A1 Mar. 4, 2004

Related U.S. Application Data

(60) Provisional application No. 60/385,603, filed on Jun. 4, 2002.

(51) Int. Cl.
*H04B 7/00* (2006.01)
(52) U.S. Cl. ............... 455/500; 455/41.2; 455/526
(58) Field of Classification Search ........... 455/41.2, 455/500, 526, 334, 337, 130; 340/10
See application file for complete search history.

(56) References Cited

U.S. PATENT DOCUMENTS

| | | | |
|---|---|---|---|
| 3,593,143 A | | 7/1971 | Nakahara |
| 4,112,372 A | | 9/1978 | Holmes et al. ............... 325/321 |
| 5,271,034 A | * | 12/1993 | Abaunza ..................... 375/150 |
| 5,406,262 A | * | 4/1995 | Herman et al. ........... 340/572.2 |
| 5,465,395 A | | 11/1995 | Bartram |
| 5,509,035 A | * | 4/1996 | Teidemann et al. ......... 375/356 |
| 5,559,828 A | * | 9/1996 | Armstrong et al. .......... 375/130 |
| 5,593,744 A | | 1/1997 | Van Vechten |
| 5,614,912 A | | 3/1997 | Mitchell ..................... 342/146 |
| 5,640,683 A | | 6/1997 | Evans |
| 5,648,765 A | | 7/1997 | Cresap et al. .......... 340/825.35 |
| 5,798,693 A | * | 8/1998 | Engellenner ............. 340/10.33 |
| 5,838,236 A | | 11/1998 | Bentley et al. .............. 340/572 |
| 5,867,500 A | | 2/1999 | Dolman et al. .............. 370/443 |

(Continued)

FOREIGN PATENT DOCUMENTS

EP 0899809 A2 3/1999

(Continued)

OTHER PUBLICATIONS http://www.bluetooth.com/ The Official Bluetooth SIG Website.

(Continued)

*Primary Examiner*—Yuwen Pan
(74) *Attorney, Agent, or Firm*—Christensen O'Connor Johnson Kindness PLLC

(57) ABSTRACT

The present invention relates to a reflective communication system that allows information from wireless communication devices, such as radio-frequency identification devices (RFID), to be reflectively communicated to a receiver in lieu of using a separate communication system. A transmitter transmits a communication signal, having a carrier frequency, to the wireless communication device to provide power. The wireless communication device modulates a data signal onto the communication signal to form a reflected data signal. The wireless communication device reflects the reflected data signal directly to the receiver. In this manner, the process of communicating information from a wireless communication device is accomplished in one communication system rather than two. If the receiver also directly receives the communication signal from the transmitter, the receiver can determine the location of the wireless communication device relative to the transmitters.

35 Claims, 9 Drawing Sheets

U.S. PATENT DOCUMENTS

| | | | |
|---|---|---|---|
| 5,867,800 A | 2/1999 | Leif | 701/23 |
| 5,929,760 A | 7/1999 | Monahan | 340/572.7 |
| 5,936,527 A | 8/1999 | Isaacman et al. | 340/572.1 |
| 6,114,971 A | 9/2000 | Nysen | 340/825.54 |
| 6,150,921 A | 11/2000 | Werb et al. | 340/10.1 |
| 6,170,748 B1 | 1/2001 | Hash et al. | 235/451 |
| 6,236,315 B1 | 5/2001 | Helms | |
| 6,255,800 B1 | 7/2001 | Bork | 320/115 |
| 6,266,362 B1 | 7/2001 | Tuttle et al. | 375/141 |
| 6,509,836 B1* | 1/2003 | Ingram | 340/572.4 |
| 6,650,225 B2* | 11/2003 | Bastian et al. | 340/5.92 |
| 6,717,516 B2 | 4/2004 | Bridgelall | |
| 6,812,824 B1* | 11/2004 | Goldinger et al. | 340/10.1 |
| 6,898,434 B2* | 5/2005 | Pradhan et al. | 455/456.1 |
| 7,084,740 B2* | 8/2006 | Bridgelall | 340/10.42 |
| 2001/0016479 A1 | 8/2001 | Wood, Jr. | |
| 2003/0007473 A1* | 1/2003 | Strong et al. | 370/338 |

FOREIGN PATENT DOCUMENTS

| | | |
|---|---|---|
| EP | 1122684 B1 | 1/2008 |
| GB | 2235336 A | 2/1991 |
| WO | 91/08557 A2 | 6/1991 |
| WO | WO 01/29574 A2 | 4/2001 |
| WO | WO 01/82520 A2 | 11/2001 |

OTHER PUBLICATIONS

European Examination Report dated May 15, 2008, issued in corresponding Application No. EP 07000665.5, filed Jun. 4, 2003.

* cited by examiner

REFLECTIVE COMMUNICATION USING RADIO-FREQUENCY DEVICES

RELATED APPLICATION

This application claims priority and the benefit of U.S. Provisional Patent Application Ser. No. 60/385,603 filed Jun. 4, 2002, which is incorporated by reference herein in its entirety.

FIELD OF THE INVENTION

The present invention relates to use of radio-frequency devices to reflectively communicate information to a receiver using a communication signal from a local transmitter.

BACKGROUND OF THE INVENTION

Wireless communication devices are commonly used today to wirelessly communicate information about goods. For example, transponders may be attached to goods during their manufacture, transport and/or distribution to provide information, such as an identification number, expiration date, date of manufacture or "born on" date, lot number, and the like. The transponder allows this information to be obtained unobtrusively using wireless communication without slowing down the manufacturing, transportation, and/or distribution process.

Short-range transmitters or interrogation devices are located throughout the manufacturing facility to communicate with the wireless communication devices associated with goods during their manufacture, transport and/or distribution. These transmitters are located in specific areas within the facility to interrogate the wireless communication devices in defined areas. The transmitters are typically located apart from each other so that their radio-frequency signals do not overlap with one another. A common facility may have to contain hundreds if not thousands of transmitters so that wireless communication devices in all areas of the facility can be interrogated by a transmitter.

The information received by the transmitters from wireless communication devices is typically communicated back to a central processing receiver or hub using a communications network. The hub processes all of the information for any number of reasons, including, but not limited to, tracking and monitoring of the goods. Due to the large number of transmitters required, the communications network linking the transmitters to the hub can be quite complex and involve hundreds if not thousands of wiring connections, thereby causing additional installation and material expense above the expense of the transmitters and the hubs. If the additional expense of this communication network could be eliminated, the prohibitive nature of implementing a wireless communication system using wireless communication devices in manufacturing and/or distribution facilities would be lessened.

SUMMARY OF THE INVENTION

The present invention relates to a reflective communication system that allows information from wireless communication devices, such as radio-frequency identification devices (RFID), to be reflectively communicated to a receiver in lieu of using a separate communication system. A transmitter transmits a communication signal, having a carrier frequency to a wireless communication device to provide power. The wireless communication device rectifies the communication signal for power and modulates a data signal onto the communication signal to form a reflected data signal. Instead of the transmitter also receiving back the reflected data signal from the wireless communication device and separately re-transmitting the reflected data signal to a receiver using a separate communication system, the wireless communication device reflects the reflected data signal directly to a receiver. In this manner, the process of communicating information from a wireless communication device is accomplished in one communication system rather than two.

In one embodiment, a transmitter transmits a communication signal having a carrier frequency to a wireless communication device. The wireless communication device receives the communication signal and reflectively modulates a data signal containing data stored in the wireless communication device to form a reflected data signal. A receiver receives the reflected data signal and demodulates the carrier frequency and the modulated data signal from the reflected data signal to recover the data in clear format. The data may be any type of information, including information about goods or a container associated with the wireless communication device.

In another embodiment, multiple transmitters are placed in the vicinity of wireless communications devices. The receiver receives reflected data signals from wireless communication devices that were interrogated by one or more transmitters.

In another embodiment, a single transmitter is coupled to a leaky-feeder cable to provide an antenna for transmitting communication signals to wireless communication devices. The cable has a plurality of openings that leak and radiate out the communication signal transmitted by the transmitter. In this manner, the communication signal radiates at multiple locations at the points of the openings in the cable simulating multiple transmitters.

In another embodiment, the communication signal is mixed with a direct spread spectrum code to spread the communication signal. Multiple transmitters communicate the communication signal at the same operating frequency, but using different spread spectrum codes. The wireless communication device receives the spread communication signal and reflectively modulates a data signal to form a reflected data signal. This reflected data signal is spread due to the communication signal being spread. The receiver sequences through the spread spectrum codes in the spread spectrum coding sequences to recover the original, unspread reflected data signal. The receiver can determine which transmitter transmitted the communication signal contained in the reflected data signal since the receiver knows each spread spectrum code for each of the transmitters.

If the receiver desires to listen to reflected data signals that originated from wireless communication devices in the field of view of a particular transmitter, the receiver can set its spread spectrum code to only mix the spread spectrum code of a particular transmitter with the reflected data signal. In this manner, the receiver will only recover the data from a wireless communication device that is in the field of view of a selected transmitter.

In another embodiment, the receiver receives the communication signal directly from the transmitter as well as the reflected data signal from a wireless communication device. In this manner, the receiver can compare the time delay between the directly received communication signal and the communication signal component of the reflected data signal from the wireless communication device to determine the distance between the wireless communication device and a transmitter. If this embodiment is used in conjunction with the spread spectrum coding embodiment, the receiver can determine the approximate location of the wireless communication device by knowing (1) the distance between the transmitter and the wireless communication device; and (2) the particular transmitter that interrogated the wireless communication device. If transmitters are located so that multiple transmitters can transmit communications signals to a single wireless communication device, and the receiver knows the distance between transmitters, the receiver can determine the exact location of the wireless communication device using triangulation in this embodiment.

In another embodiment, the communication signal received by the wireless communication device to power the wireless communication device is received from an incident radio signal from a separate communication system. In one embodiment, the transmitter is a Bluetooth transceiver. A receiver is configured with two antennas to receive the Bluetooth communications signal and the reflected data signal. The receiver mixes the two signals together to remove the Bluetooth communication signal from the reflected data signal to obtain the data in clear format.

In another Bluetooth embodiment, the transmitter and receiver functionality are combined in a single Bluetooth transceiver.

Those skilled in the art will appreciate the scope of the present invention and realize additional aspects thereof after reading the following detailed description of the preferred embodiments in association with the accompanying drawing figures.

BRIEF DESCRIPTION OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The present invention relates to a reflective communication system that allows information from wireless communication devices, such as radio-frequency identification devices (RFID), to be reflectively communicated to a receiver in lieu of using a separate communication system. A transmitter transmits a communication signal, having a carrier frequency to the wireless communication device to provide power. The wireless communication device modulates a data signal onto the communication signal to form a reflected data signal. Instead of the transmitter also receiving back the reflected data signal from the wireless communication device and re-transmitting the reflected data signal to a receiver using a separate communication system, the wireless communication device reflects the reflected data signal directly to the receiver. In this manner, the process of communicating information from a wireless communication device to a receiver is accomplished in one communication system rather than two.

Figure 1:
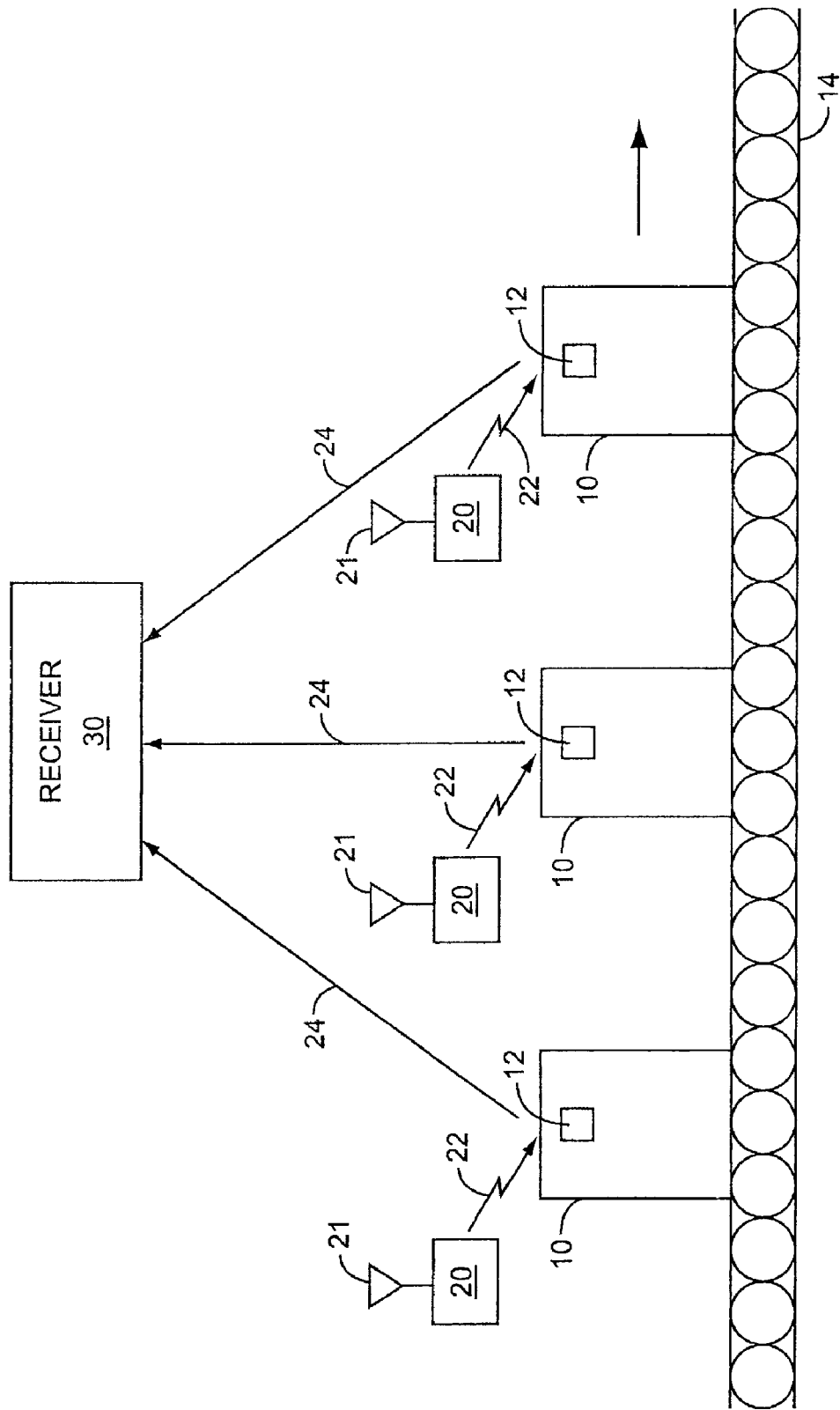
FIG. 1 is a schematic diagram of a communication system using reflective communication.

Turning now specifically to the invention, and to FIG. 1, a communication system according to one embodiment of the present invention is disclosed. Containers 10 containing wireless communication devices 12 are being transported in a manufacturing facility on an assembly line 14. The wireless communication device 12 may contain information relating to its associated container 10, such as its identification, the type of goods transported in the container 10, the date of manufacture or "born on" date of the goods in the container 10, etc. The containers 10 come into proximity to transmitters 20 placed in positions that are in close vicinity to the containers 10 during their manufacture and/or transport. The transmitter 20 may be an interrogation reader that interrogates a RFID, such as that described in co-pending patent application Ser. No. 09/712,645 entitled "Wireless transport communication device and method," filed on Nov. 14, 2000, and incorporated herein by reference in its entirety.

The transmitter 20 continuously transmits a communication signal 22 through its antenna 21 to any wireless communication devices 12 in the field of view of the antenna's 21 radiation. The transmitter 20 is powered by either a direct current (DC) or alternating current (AC) power source. When the wireless communication device 12 receives the communication signal 22 from the transmitter 20, the wireless communication device 12 rectifies the signal to power the wireless communication device 12. The wireless communication device 12 reflectively modulates the incoming energy with a data signal containing information stored in the wireless communication device 12, such as information relating to its associated container 10 for example, to create a reflected data signal 24. For example, the incoming energy from the communication signal 22 could be reflectively modulated with a Manchester bi-phase encoded data sequence to generate the data signal. The reflected data signal 24 is reflected to a receiver 30.

For a detailed explanation on how a wireless communication device 12 can be powered using an incoming communication signal and how a wireless communication device 12 reflects an incoming communication signal 22 to communicate information, see U.S. Pat. No. 5,347,280, entitled "Frequency diversity transponder arrangement," incorporated herein by reference in its entirety.

The wireless communication device 12 may be either an active/semi-passive or passive device. An active or semi-passive wireless communication device 12 contains its own power source for transmission of information. The power source may be a battery for example. A passive wireless communication device 12 uses rectified power from an incoming communication signal 22 as the sole source of energy to provide power to the wireless communication device 12 for reflective communication of information. If the wireless communication device 12 is a passive device, the reflected data signal 24 tends to be strong due to the high power in the communication signal 22 required to also provide power to the wireless communication device 12.

Figure 2:
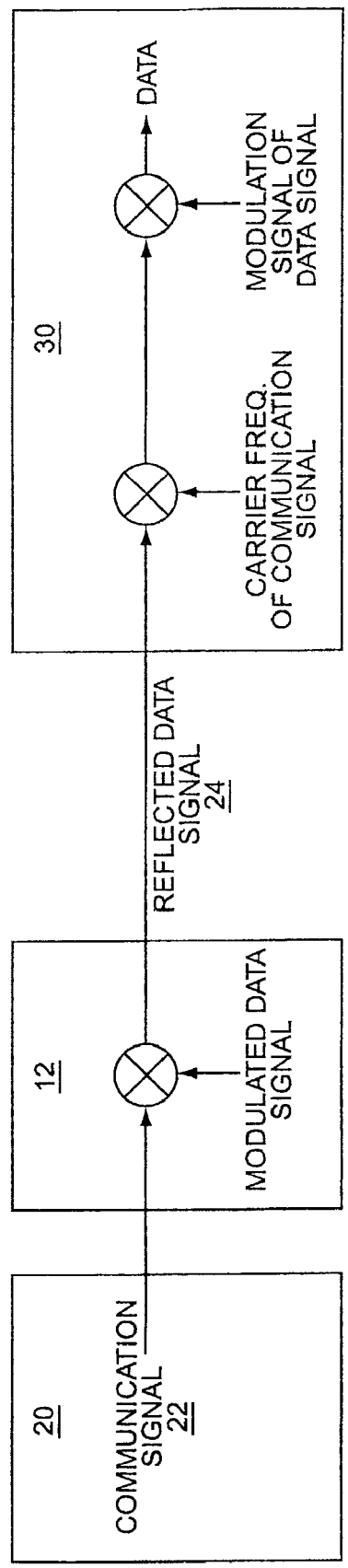
FIG. 2 is a schematic signal diagram of the communication system illustrated in FIG. 1.

FIG. 2 illustrates a schematic signal diagram of the communication system illustrated in FIG. 1. The communication signal 22 transmitted by the transmitter 20 is generated by modulating a carrier frequency. The carrier frequency is also present on the reflected data signal 24 since the wireless communication device 12 forms the reflected data signal 24 by reflecting the incoming communication signal 22. When the receiver 30 receives the reflected data signal 24, it demodulates the carrier frequency contained on the communication signal 22 to create the data signal previously modulated by the wireless communication device 12. The data signal is demodulated so that the data can be obtained in clear format. The data contains the information stored in the wireless communication device 12 and may be related to data concerning its associated container 10. In this embodiment, the receiver 30 must have knowledge of the carrier frequency used by the transmitter 20 to create the communication signal 22 and the modulation placed onto the data signal by the wireless communication device 12 so that receiver 30 can demodulate the carrier frequency and the data modulation from the reflected data signal 24.

In another embodiment, and as illustrated in FIG. 1, multiple transmitters 20 are placed in the manufacturing and/or distribution facility. All of the reflected data signals 24 from the wireless communication devices 12 are reflected to the single receiver 30. In this manner, the receiver 30 receives information from all of the wireless communication devices 12 at one location. Since this information may include a unique identification, this information can be used to associate information received from the reflected data signals 24 with a specific wireless communication device 12. For example, if a wireless communication device 12 reflectively communicates its identification and the temperature of its associated container 10 to the receiver 30, the receiver 30 can record the temperature of the container 10 and determine if the temperature is within a desired range. For more information on tracking goods, such as containers 10, using wireless communication devices 12, see co-pending patent application Ser. No. 09/502,315, filed on Feb. 11, 2001, entitled "Deployable identification device," incorporated herein by reference in its entirety.

Figure 3:
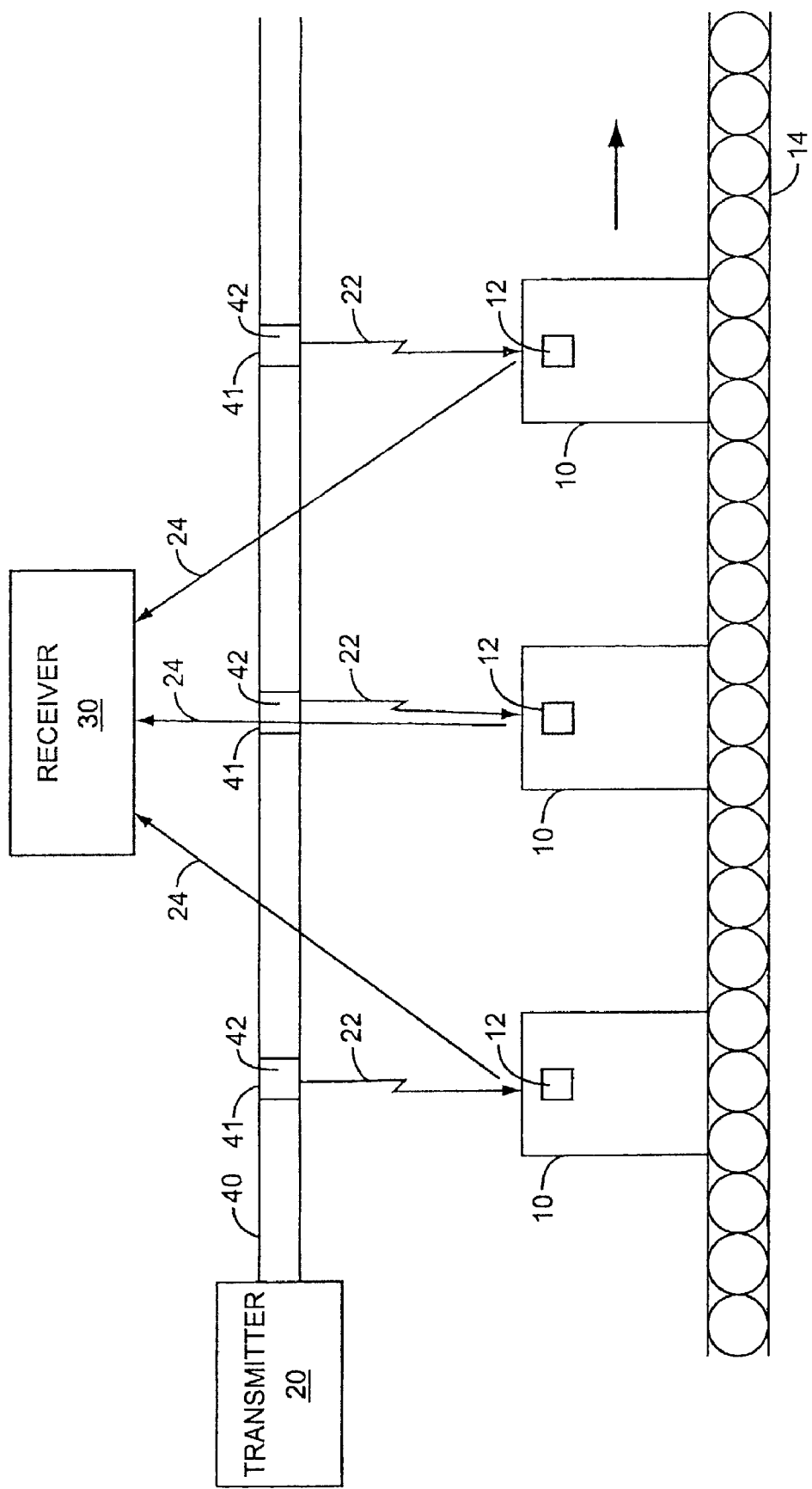
FIG. 3 is a schematic diagram of a communication system using a leaky-feeder transmitter to achieve reflective communication.

FIG. 3 illustrates another embodiment of the present invention that is similar to FIG. 1. However, the transmitter 20 is comprised of a leaky-feeder cable 40 transmission line. A leaky-feeder cable 40 is a cable or other conduit that has a plurality of openings 41 along its path. The leaky-feeder cable 40 contains an antenna 21 inside and all along the path of the leaky-feeder cable 40 (not shown). The antenna 21 is coupled to a single transmitter 20. In this manner, a communication signal 22 transmitted by the transmitter 20 is transmitted through the leaky-feeder cable 40 so that the communication signal 22 radiates out of the cable 40 at each of the openings 41.

The use of multiple openings 41 allows a single transmitter 20 using a leaky-feeder cable 40 to act as multiple transmitters 20. The cable 40 can be rapidly deployed in areas where interrogation of wireless communication devices 12 is required. Another advantage of a leaky-feeder cable 40 is that multiple power connections are not required at each point of radiation of the communication signal 22 like required for the multiple transmitters 20 illustrated in FIG. 1. Depending on the manufacturing and/or distribution facility, it may be difficult and/or prohibitively expensive to provide power sources at each desired point of radiation of the communication signal 22. Only the single transmitter 20 requires a power connection for the leaky-feeder cable 40 embodiment.

The leaky-feeder cable 40 may contain conductive sleeves 42 in the openings 41 that are retractable to open and close so that the communication signal 22 is not radiated through the opening 41 if the conductive sleeve 42 in the opening 41 is closed. In this manner, the leaky-feeder cable 40 may be configured to provide only the desired number of openings 41 for radiation of the communication signal 22. The communication signal 20 power can be spread across the exact desired number of openings 41 instead of radiating out of additional openings 41 that are either unneeded or not in proximity to the path of wireless communication devices 12.

The reflected data signals 24 received by the receiver 30 in the leaky-feeder cable 40 embodiment contain the same carrier frequency, just as in the embodiment illustrated in FIG. 1. However, there will be a time delay between the received reflected data signals 24 at the receiver 30 due to the time delay between the communication signal 22 radiated at different openings 41. A wireless communication device 12 located in the proximity of the opening 41 closest to the transmitter 20 will reflectively communicate a reflected data signal 24 to the receiver 30 sooner in time than a wireless communication devices 12 located in proximity to an opening 41 located farther away. Depending on the geometry of the leaky-feeder cable 40, the receiver 30 can approximate the location of the wireless communication device 12 along the leaky-feeder cable 40. The receiver 30 can compare the relative time delay between reflected data signals 24 received from wireless communication devices 12, and determine which reflected data signals 24 originated from wireless communication devices 12 closer to the transmitter 20 than others due to the difference in time delay of the reflected data signals 24.

In another embodiment of the present invention, multiple transmitters 20 transmit communication signals 22 using direct spread spectrum communications. The transmitters 20 all transmit communication signals 22 using the same operating frequency, but using direct spread spectrum codes. Spread spectrum communications is a means of transmitting a communication signal over a much wider frequency bandwidth than the minimum bandwidth required to transmit the information. The communication signal 22 is mixed with a spread spectrum code from a spread spectrum coding sequence to "spread" the communication signal 22 across a wide bandwidth, thereby making the original communication signal 22 virtually undetectable. The original communication signal 22 is retrieved or "de-spread" by mixing the same spread spectrum code with the spread communication signal 22. More information on spread spectrum communications is disclosed in U.S. Pat. Nos. 4,112,372 and 6,266,362 and incorporated herein by reference in their entirety.

If the transmitters 20 transmit communication signals 22 that have been mixed with a spread spectrum code, the receiver 30 can configure itself to only receive reflected data signals 24 from wireless communication devices 12 that are in the range of a particular transmitter 20. In this manner, the receiver 30 can determine whether a received reflected data signal 24 was reflected from a wireless communication device 12 in the range of a selected transmitter 20. This allows the receiver 30 to have knowledge of range of location of a wireless communication device 12 and/or its associated container 10 (i.e. the field of view of the selected transmitter 20).

The receiver 30 has the spread spectrum coding sequences and the spread spectrum codes used by each of the transmitters 20 stored in memory. For example, if there are seven transmitters 20 in the communication system, each of the seven transmitters 20 must mix a different spread spectrum code with the communication signal 24 in order for the receiver 30 to be able to distinguish between different transmitters 20. In the present embodiment, the transmitters 20 use a spread spectrum coding sequence with a low cross-correlation index. The receiver 30 is programmed to have knowledge of the location of each of the transmitters 20. The receiver 30 can determine that a particular transmitter 20 originated a communication signal 22 that resulted in a received reflected data signal 24 by mixing the reflected data signal 24 with each of the spread spectrum codes in the spread spectrum coding sequence used by the transmitters 20. This process is called "synchronization," and is described below. When the receiver 30 mixes the reflected data signal 24 with a spread spectrum code that results in successful "de-spreading," the receiver 30 knows that the wireless communication device 12 that reflected the reflected data signal 24 is in the field of range of the transmitter 20 that used this same spread spectrum code to originally spread the communication signal 22.

Figure 4:
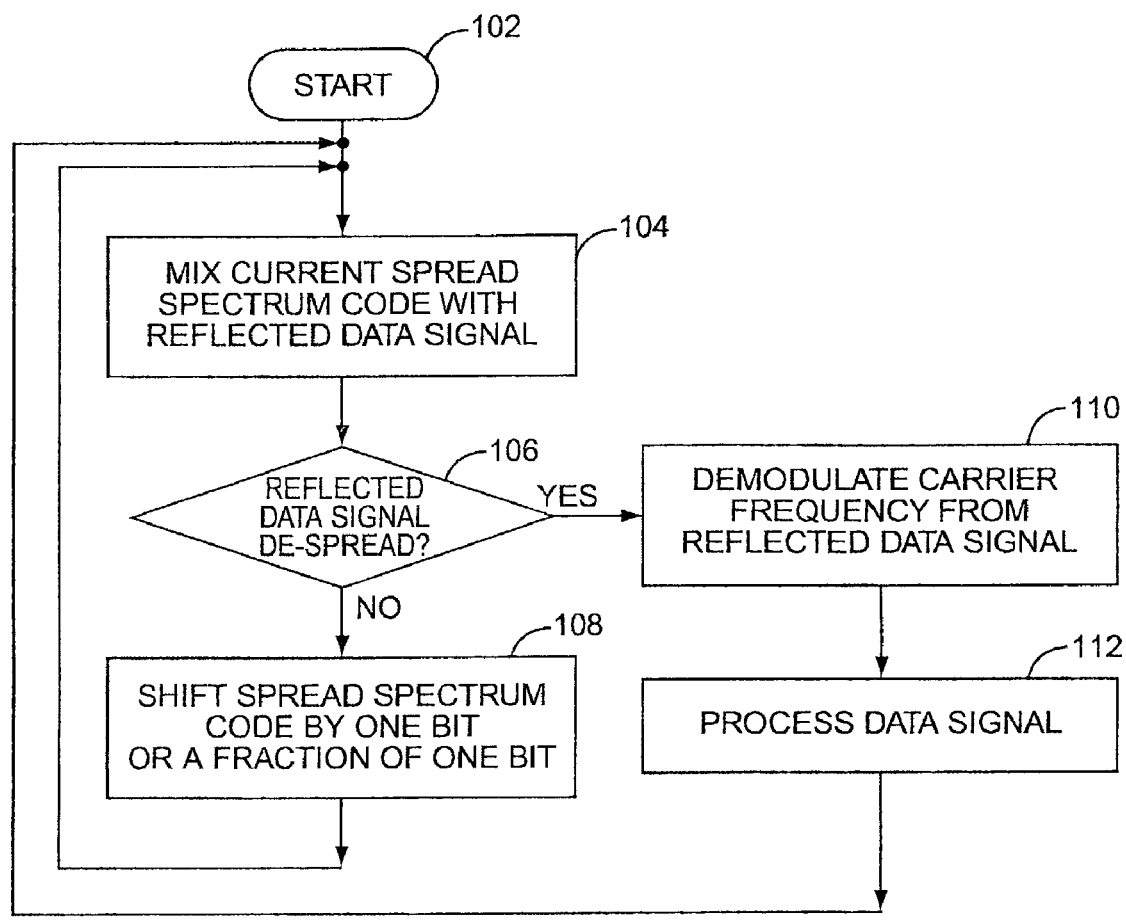
FIG. 4 is a flowchart diagram of the receiver mixing the received reflected data signal with a spread spectrum code to determine the approximate location of the wireless communication device that reflected the reflected data signal.

FIG. 4 illustrates a flowchart of the process of synchronization whereby the receiver 30 correlates or matches the spread spectrum code to the spread spectrum code used to spread the communication signal 22 contained in the received reflected data signal 24. The spread spectrum sequence is generated from a shift register of a defined number of bits, say 10, with a series of "taps" which are combined in an exclusive or logic function and fed back into the shift register input. This logic configuration, which can also be emulated in software, produces a 1023 bit long pseudo random sequence; that is every 1023 clock cycles to the shift register the code repeats itself. Dependent on the position of the taps, a number of discrete pseudo random sequences can be produced with low cross correlation indices.

The process starts (block 102), and the receiver 30 mixes the reflected data signal 24 with the spread spectrum code from the spread spectrum coding sequence (block 104). The receiver 30 detects if the reflected data signal 24 was "de-spread" during the mixing process using the spread spectrum code (decision 106). If not, the receiver 30 shifts the spread spectrum coding sequence by one bit or a fraction of one bit (block 108) and repeats the process by mixing the reflected data signal 24 again with the shifted spread spectrum code (block 104). If the reflected data signal 24 has been successfully "de-spread" (decision 106), the receiver 30 recovers the data signal by demodulating the carrier frequency of the communication signal 24 from the reflected data signal (block 110) and processes the data signal for any desired purpose (block 112). The process repeats by the receiver 30 detecting the next reflected data signal received (decision 102).

Figure 5:
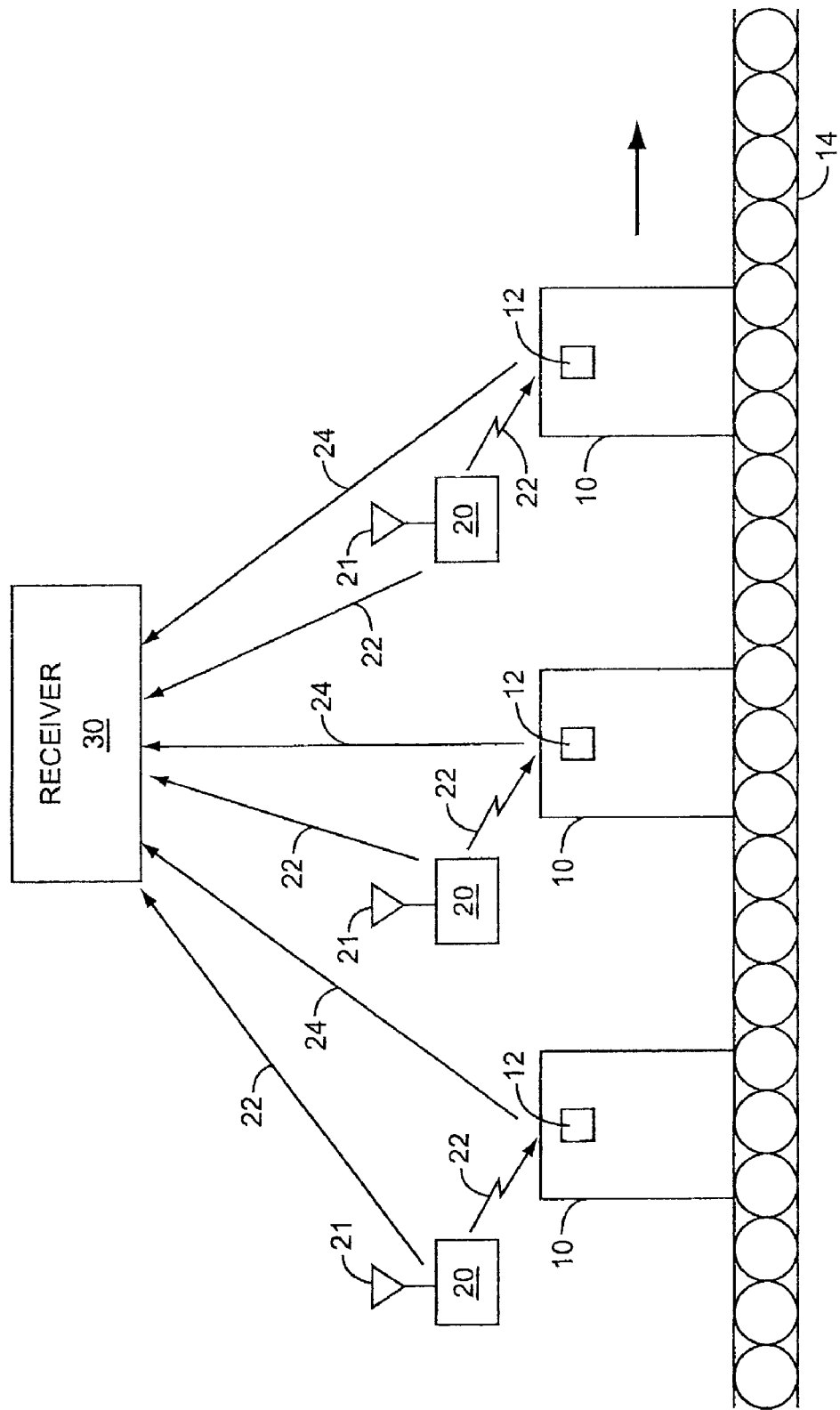
FIG. 5 is a schematic diagram of a second embodiment of a communication system using reflective communication.

FIG. 5 illustrates another embodiment of the present invention that is similar to FIG. 1. However, in this embodiment, the receiver 30 directly receives the communication signal 22 from the transmitter 20 as well as the reflected data signal 24. The receiver 30, by its direct receipt of the communication signal 22 and the reflected data signal 24, again by using the spread spectrum coding described above and illustrated in FIG. 4, can also determine the distance between the wireless communication device 12 and the transmitter 20 to achieve a more exact location of the wireless communication device 12.

Figure 6:
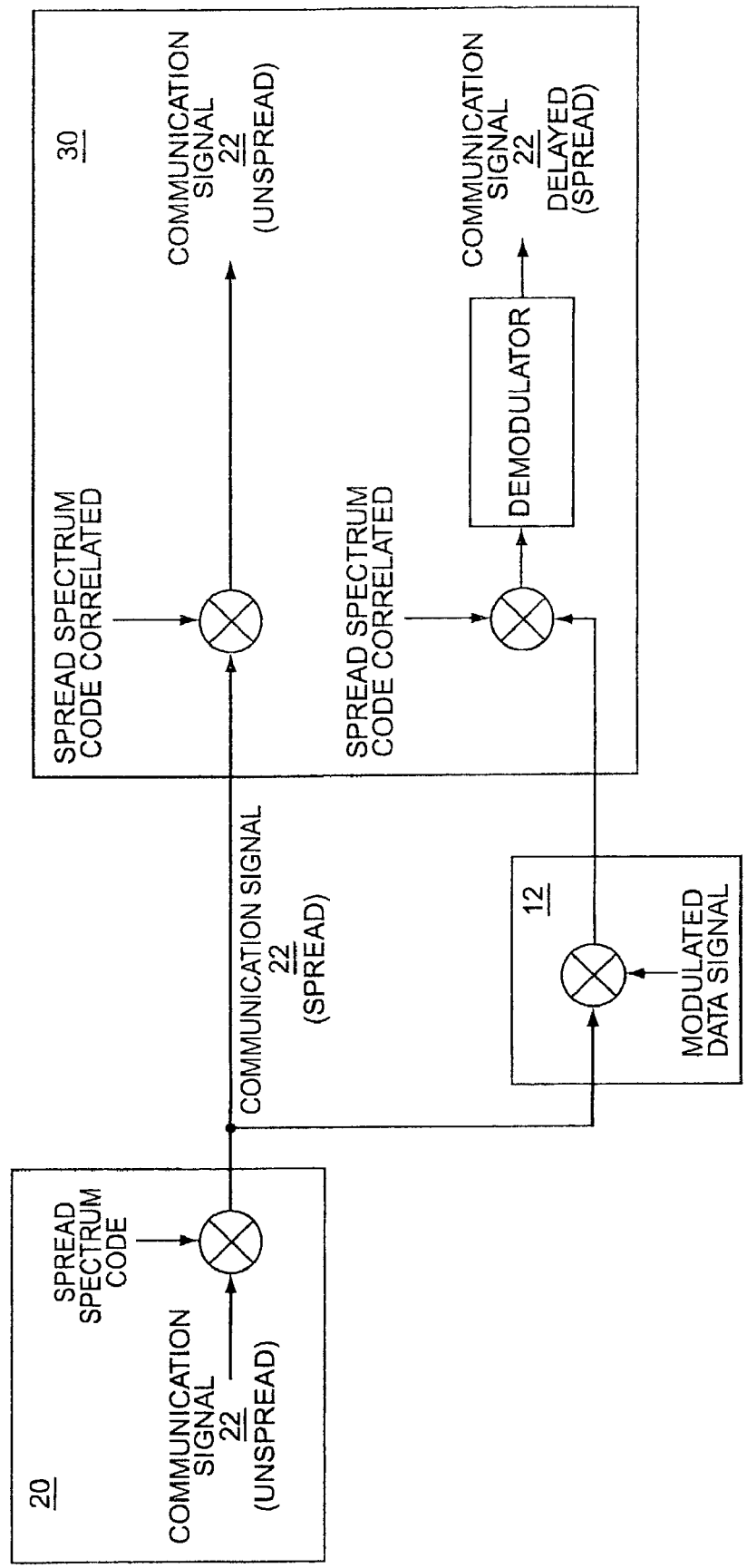
FIG. 6 is a flowchart diagram of the communication system illustrated in FIG. 5.

FIG. 6 illustrates a schematic signal diagram where the receiver 30 is able to determine both the transmitter 20 that transmitted the communication signal 22 to a wireless communication device 12 and the distance between the wireless communication device 12 and the transmitter 20. The receiver 30 receives the reflected data signal 24 just as described above and as illustrated in FIGS. 1 and 2. The receiver 30 sequences through the spread spectrum coding sequence to mix with the received reflected data signal 24, just as described above and illustrated in FIG. 3. When the receiver 30 mixes the correlated spread spectrum code with the reflected data signal 24, the resulting signal is the original communication signal 22 offset in frequency by the modulated data signal, as produced and reflected by the wireless communication device 12.

The receiver 30 also receives the communication signal 22 directly from the transmitter 20. The communication signal 22 has been mixed with the transmitter's 20 spread spectrum code, so the receiver 30 receives the communication signal 22 after it has been spread by the transmitter 20. The receiver 30 sequences through the spread spectrum coding sequence to mix with the communication signal 22 to de-spread the communication signal 22 back into its original format. After the receiver 30 de-spreads both the communication signal 22, received directly from the transmitter 20, and the reflected data signal 24, received from the wireless communication device 12, the receiver 30 can demodulate the modulated data signal from the de-spread reflected data signal 24.

The time delay between the de-spread communication signal 22 received directly from the transmitter 20 and the de-spread communication signal 22 obtained from the reflected data signal 24 can be correlated to the distance between the wireless communication device 12 and the transmitter 20. In this manner, the receiver 30 is able to determine which transmitter 20 interrogated the wireless communication device 12 and the distance between the wireless communication device 12 and the transmitter 20. If the transmitters 20 are configured so that multiple transmitters 20 can transmit the communication signal 22 to the same wireless communication device 12, and the receiver 30 knows the distance between transmitters 20, the receiver 30 can determine the exact location of a wireless communication device 12 that reflects a reflected data signal 24 to the receiver 30 using triangulation.

The embodiment illustrated in FIGS. 5 and 6 can be achieved using a communications signal 22 in which the frequency is varied in a known way with time. This is another form of spreading the communication signal in the frequency domain. By synchronizing its demodulating signal in frequency to a particular transmitter 20, the receiver 30 can listen to the reflected data signals 24 from wireless communication devices 12 of the chosen transmitter 20. In a similar way to direct sequence spread spectrum, system correlation may be used to determine range of the wireless communication devices 12.

Figure 7:
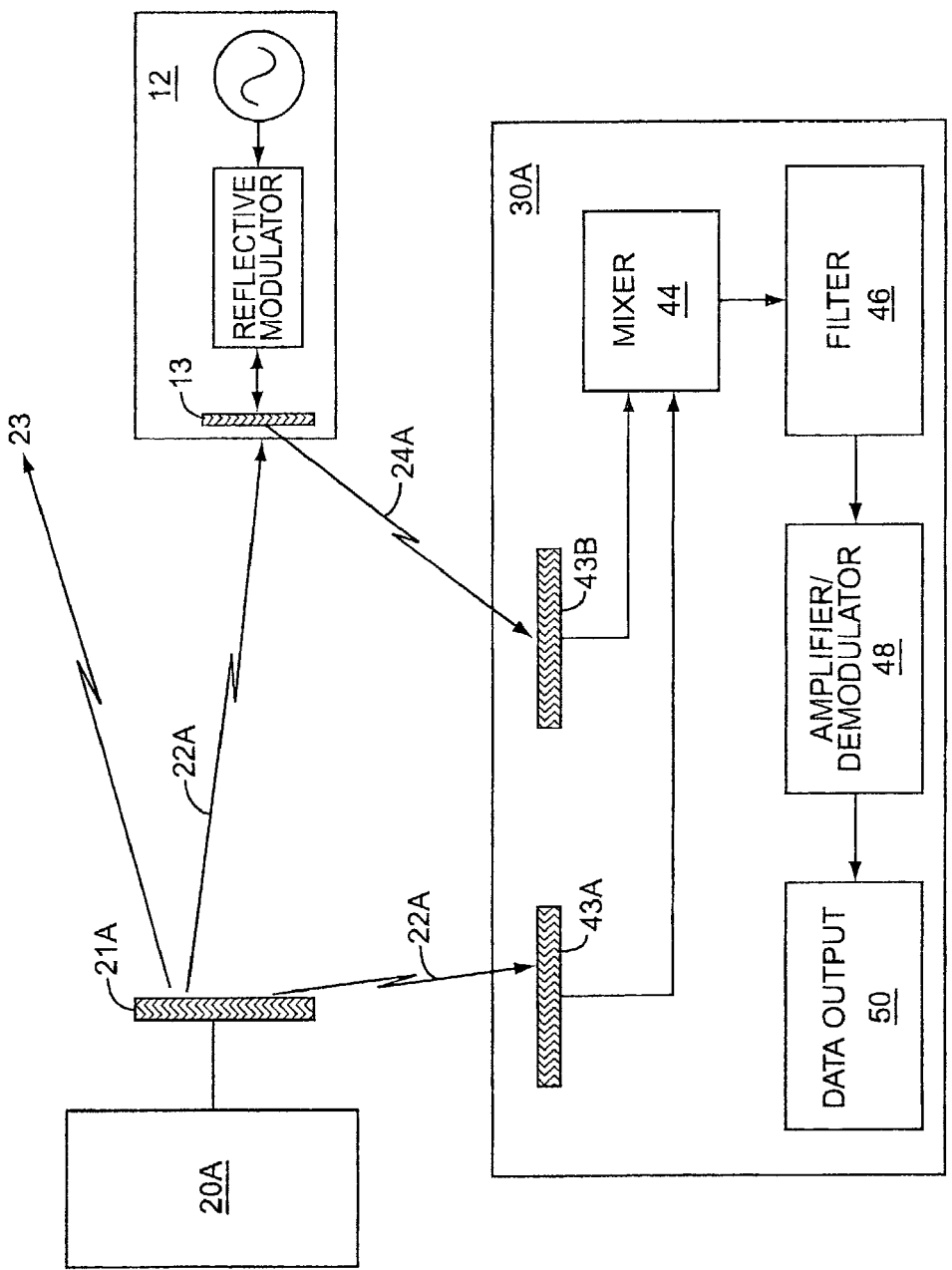
FIG. 7 is a schematic diagram of a reflective communication system using an incident radio signal from a Bluetooth transmitter as the communication medium.

In another embodiment of the present invention, illustrated in FIG. 7, wherein the receiver 30 receives an incident radio signal energy from another communication system, either cooperatively or not, to form the communication signal 22 transmitted to the wireless communication device 12. In this manner, a transmitter 20 used for a different communication system can also be used to communicate a communication signal 22 to wireless communication devices 12 to be reflectively modulated to a receiver 30. It may be that a manufacturing and/or distribution facility has transmitters 20 already installed in the path of manufacture and/or distribution of containers 10 or other goods that contain wireless communication devices 12 that can be used to accomplish the present invention as well.

This particular embodiment uses a transmitter 20 that complies with the "Bluetooth" standard, called a Bluetooth transmitter 20A. A Bluetooth transmitter 20A is a 2.45 GHz spread spectrum transceiver. The Bluetooth transmitter 20A uses Gaussian Frequency Shift Keying (GFSK) modulation with a modulation index between 0.28 and 0.35. The bit rate is 1 Mbps, and channel spacing is 1 MHz. More information about Bluetooth is disclosed in U.S. Pat. No. 6,255,800, entitled "Bluetooth enabled mobile device charging cradle and system," and at www.bluetooth.com, both of which are incorporated herein by reference in their entirety The flood of energy from the communication signal 22A may be used to provide power and a communication medium for passive wireless communication devices 12 and a communication medium for semi-passive wireless communication devices 12 in the field of view of the Bluetooth transmitter 20A.

This transmitter 20A can be used to transmit communication signals 22A to both passive and semi-passive/active wireless communication devices 12. Passive wireless communication devices 12 utilize the energy from the communication signal 22A received through its antenna 13 by rectifying the incoming communication signal 22A, just as previously described for the embodiment illustrated in FIG. 1. If the energy received by the wireless communication device 12 from a single transmit cycle of the communication signal 22A from the Bluetooth transmitter 20A is not sufficient to power the wireless communication device 12, the wireless communication device 12 can store energy from multiple bursts of the communication signal 22A. When a sufficient amount of energy is available to the wireless communication device 12, the wireless communication device 12 reflectively modulates the communication signal 22A with a data signal containing data stored in the wireless communication device 12 and/or associated with its container 10.

Semi-passive wireless communication devices 12 can operate in essentially the same manner as passive wireless communication devices 12. However, since semi-passive wireless communication devices 12 contain a battery or other energy source as a power source, semi-passive wireless communication devices 12 do not need to wait to store energy from multiple bursts of the communication signal 22A. The energy in the power source can be used to produce a reflected data signal 24A on the first transmission of the communication signal 22A from the Bluetooth transmitter 20A.

The reflected data signal 24A is recovered by a receiver 30A, as illustrated in FIG. 7. The receiver 30A is ideally placed close to the Bluetooth transmitter 20A so that it will receive a relatively strong sample of the communication signal 22A since a Bluetooth transmitter 20A is a relatively short range transmitter. A first antenna 43A in the receiver 30A is configured to receive the communication signal 22A at the 2.45 GHz operating frequency from the Bluetooth transmitter 20A. The second antenna 43B is configured to received the reflected data signal 24A from the wireless communication device 12. A mixer 44 inside the receiver 30A mixes the communication signal 22A with the reflected data signal 24A to remove the GFSK modulation from the original communication signal 22A, which is also present in the reflected data signal 24A. When the mixing occurs, the communication signal 22A (f1) mixes with and the reflected data signal 24A to produce f1 and f2 and the data signal, f1 and f2. The mixed product of the communication signal 22A with itself (as included in the reflected data signal 24A) yields a DC signal, representing the cancellation of the modulation frequency, the reflected data signal 24, and a frequency signal of 2 times the modulation frequency (f1 and f2). The DC and (f1 and f2) signals are rejected using an appropriate filter, as is well understood.

The receiver 30A recovers the original data signal reflectively modulated onto the communication signal 22A by the wireless communication device 12 by filtering out the two times the frequency of the communication signal 22A using a filter 46. Next, an amplifier and demodulator 48 in the receiver 30A amplifies and demodulates the data signal to provide the data in clear format. The data can then be processed and/or output to any other system using a data output 50.

Figure 8:
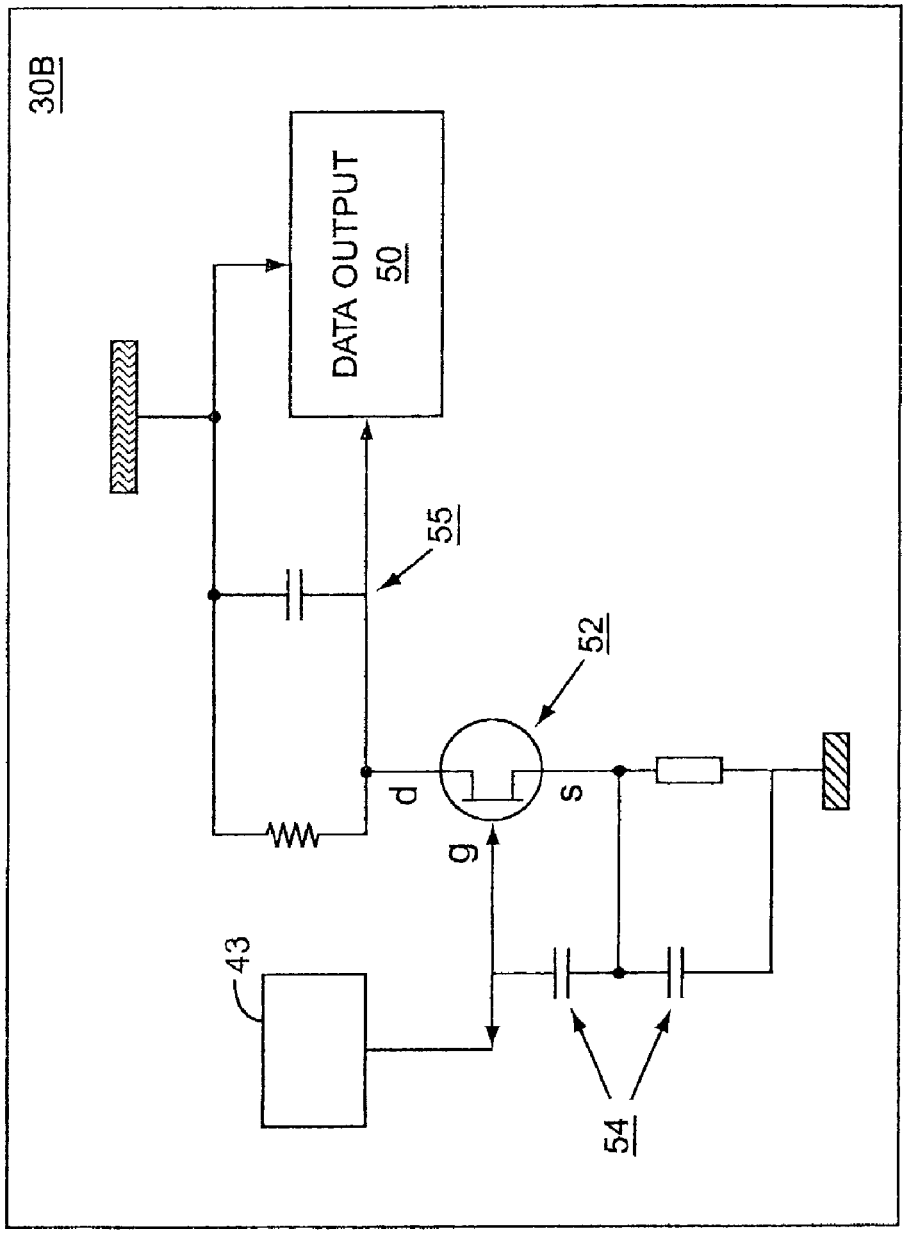
FIG. 8 is a schematic diagram of one embodiment of a receiver in the communication system illustrated in FIG. 6.

FIG. 8 illustrates an alternative embodiment of the receiver 30A that is cost reduced by reducing the complexity and power consumption of the receiver 30A. The alternative receiver is illustrated as receiver 30B. The GaAs field-emitting transistor (FET) 52 is biased such that the input at the gate terminal looks like a negative resistance with its feedback components 54. The magnitude and phase of the input remains in a stable state when connected to the antenna 43. The FET 52 is biased at low level so that a relatively small communication signal 22A from the Bluetooth transmitter 20A causes it to compress and become non-linear. In this compressed state, the receiver 30B will efficiently mix the communication signal 22A and the reflected data signal 24A together. The byproduct of the modulated data signal is recovered in the drain circuit 55 using a tuned circuit to the modulation frequency of the data signal. The drain circuit 55 demodulates the data signal to provide the data in clear format to the data output 50 to be processed and/or output to another system.

Figure 9:
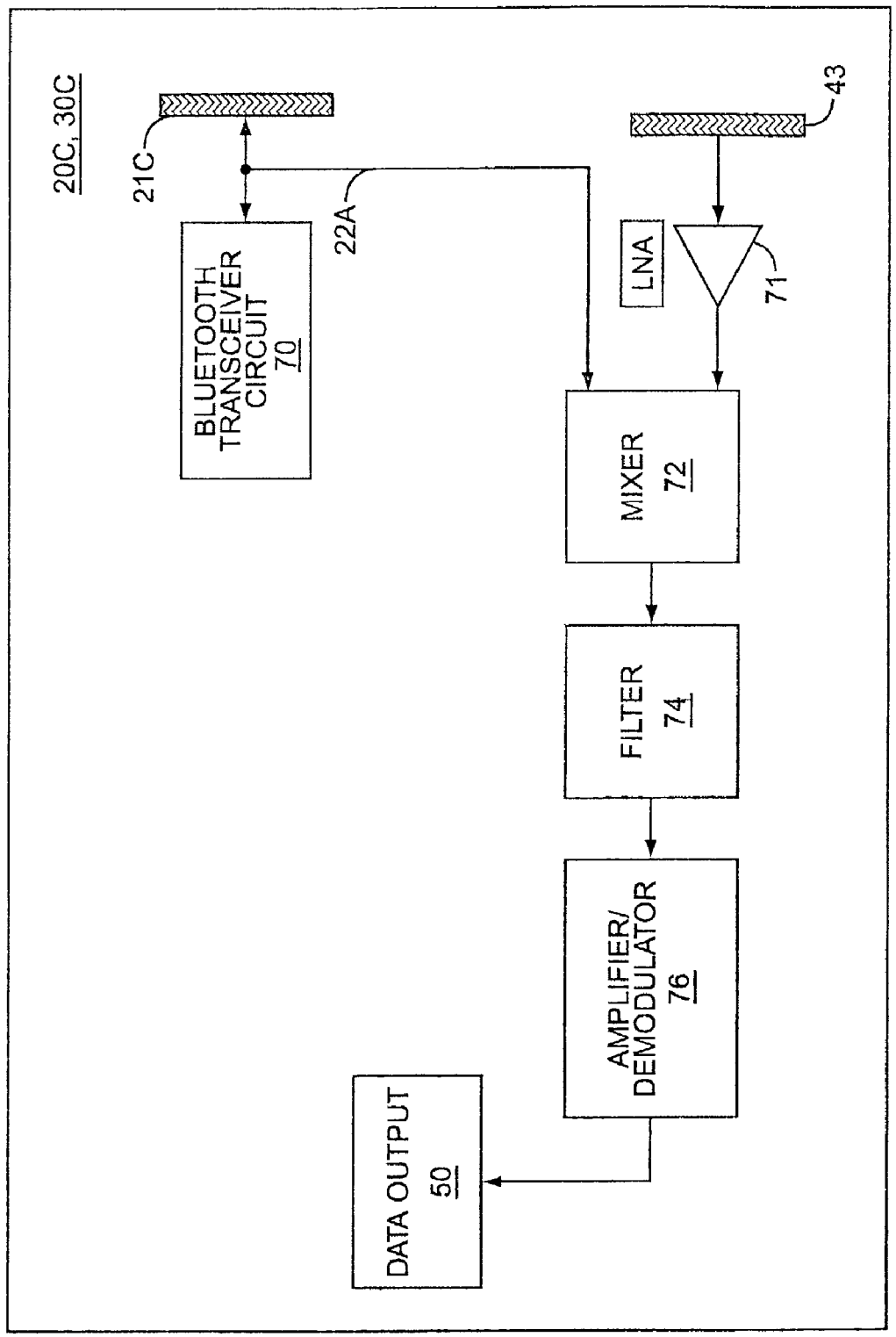
FIG. 9 is a schematic diagram of a combined transmitter and receiver for the communication system illustrated in FIG. 7.

FIG. 9 illustrates another alternative embodiment of a Bluetooth transmitter 20A. In this embodiment, the Bluetooth transmitter 20A and the receiver 30A are integrated and combined into a single Bluetooth transceiver 20C, 30C. In this embodiment, a directly connected portion of the communication signal 22A is used as the local oscillator for the mixing process to remove the communication signal 22A from the reflected data signal 24A. Two separate antennas 21 and 43 are still provided. The first antenna 21 is the Bluetooth transceiver 20C, 30C transmit and receive antenna. The second antenna 43 receives the reflected data signal 24A from the wireless communication device 12.

When the Bluetooth transceiver 20C, 30C receives the reflected data signal 24A from a wireless communication device 12 through antenna 43, the reflected data signal 24A is passed through a low noise amplifier 71. A mixer 72 inside the Bluetooth transceiver 20C, 30C mixes the communication signal 22A with the reflected data signal 24A to remove the GFSK modulation from the original communication signal 22A, which is also present in the reflected data signal 24A. The mixed product of the communication signal 22A with itself yields 0 or DC and two times the frequency, and the data signal. A filter 74 filters out the two times the frequency of the communication signal 22A. An amplifier and demodulator 76 amplifies and demodulates the data signal to provide the data in clear format. The data can then be processed and/or output to any other system using the data output 50.

Certain modifications and improvements will occur to those skilled in the art upon a reading of the foregoing description. It should be understood that the present invention is not limited to any particular type of component, including but not limited to the container 10, the wireless communication device 12, the transmitter 20, the antenna 21, the communication signal 22, the reflected data signal 24, and the receiver 30.

One of ordinary skill in the art will recognize that there are different manners in which these elements can accomplish the present invention. The present invention is intended to cover what is claimed and any equivalents. The specific embodiments used herein are to aid in the understanding of the present invention, and should not be used to limit the scope of the invention in a manner narrower than the claims and their equivalents.

What is claimed is:

1. A reflective communication system, comprising:
a wireless communication device configured to receive, from a first transmitter of a plurality of transmitters, an incident radio signal mixed with a spread spectrum code associated with the first transmitter and to reflectively modulate the incident radio signal with a data signal having a modulation to form a reflected data signal; and
a receiver configured to:
store, in a receiver memory, a spread spectrum coding sequence containing a plurality of receiver spread spectrum codes that respectively correlate to spread spectrum codes that are each associated with a transmitter from the plurality of transmitters;
store, in the receiver memory, information indicating a physical location of each transmitter;
receive the incident radio signal from the first transmitter and the reflected data signal from the wireless communication device;
correlate a receiver spread spectrum code from the spread spectrum coding sequence to the spread spectrum code associated with the first transmitter by mixing the receiver spread spectrum code with the reflected data signal to recover the reflected data signal in a de-spread format, wherein the spread spectrum coding sequence is generated from a shift register of a defined number of bits which are combined in a logic function and fed back into the shift register input;
recover the reflected data signal by:
detecting whether the reflected data signal was successfully de-spread during the mixing process using the receiver spread spectrum code;
if the reflected data signal was not successfully de-spread, shifting the receiver spread spectrum code in the spread spectrum coding sequence by one bit or a fraction of one bit and mixing the reflected data signal with the shifted receiver spread spectrum code; and
repeating the detecting, shifting, and mixing until the receiver spread spectrum code correlates to the spread spectrum code associated with the first transmitter and the reflected data signal is successfully de-spread;
identify the first transmitter based on the correlation of the receiver spread spectrum code that successfully de-spread the reflected data signal to the spread spectrum code associated with the first transmitter;
for a second transmitter from the plurality of transmitters, repeat the steps of receiving an incident radio signal, receiving a reflected data signal from the wireless communication device, correlating a receiver spread spectrum code to the spread spectrum code associated with the second transmitter, recovering the reflected data signal, and identifying the second transmitter; and
determine a location of the wireless communication device by:
determining a time delay between the reflected data signal and the incident radio signal for each of the first and second transmitters from the plurality of transmitters; and
using triangulation, identifying the location of the wireless communication device based on the determined time delays and the stored information indicating the physical location of each of the identified first and second transmitters.

2. The system of claim 1, wherein the incident radio signal is a 2.45 GHz GFSK modulated signal.

3. The system of claim 1, wherein the receiver is further configured to remove the modulation from said data signal to form data.

4. The system of claim 1, wherein the receiver further comprises a mixer configured to mix the incident radio signal with the reflected data signal to remove a first modulation from the reflected data signal to form the data signal.

5. The system of claim 4, wherein the receiver further comprises a demodulator configured to demodulate the modulation from the data signal to form data.

6. The system of claim 1, further comprising a transmitter configured to mix the spread spectrum code with the incident radio signal and transmit the incident radio signal in a spread format.

7. The system of claim 6, wherein the receiver is configured to choose a receiver spread spectrum code that correlates to the spread spectrum code used by a chosen one of a plurality of transmitters to receive reflected data signals from the wireless communication device in the field of view of the chosen one of the transmitters, and wherein each transmitter of the plurality of transmitters is respectively configured to mix the incident radio signal with a different spread spectrum code.

8. The system of claim 7, further comprising distinguishing the chosen one of the plurality of transmitters based on an association of the chosen transmitter with the spread spectrum code and the correlation of the receiver spread spectrum code that successfully de-spread the reflected data signal with the spread spectrum code.

9. The system of claim 6, wherein the transmitter comprises a Bluetooth compatible transceiver.

10. The system of claim 1, wherein the data signal includes information stored in the wireless communication device.

11. The system of claim 10, wherein the information stored in the wireless communication device is related to a container associated with the wireless communication device.

12. The system of claim 1, wherein the incident radio signal is reflectively modulated with a Manchester bi-phase encoded data signal.

13. The system of claim 1, wherein the spread spectrum codes in the spread spectrum coding sequence have a low cross-correlation index.

14. The system of claim 1, wherein the receiver is further configured to determine the location of the wireless communication device based on a known location of the transmitter and the determined distance between the wireless communication device and the transmitter.

15. A method of processing a data signal from a wireless communication device that uses an incident radio signal as a communication medium, the method comprising:
storing, in a memory, a spread spectrum coding sequence containing a plurality of receiver spread spectrum codes that respectively correlate to spread spectrum codes that are each associated with a transmitter from a plurality of transmitters;
storing, in the memory, information indicating a physical location of each transmitter;
for a first transmitter from the plurality of transmitters:
receiving an incident radio signal from the first transmitter, wherein the incident radio signal has been mixed with a spread spectrum code that is associated with the first transmitter;
receiving a reflected data signal from the wireless communication device, wherein the reflected data signal has been formed from reflective modulation of the incident radio signal with a data signal having a modulation;

recovering the reflected data signal by:
mixing one or more receiver spread spectrum codes in the spread spectrum coding sequence with the reflected data signal;
detecting whether the reflected data signal was successfully de-spread during the mixing process;
if the reflected data signal was not successfully de-spread, shifting the receiver spread spectrum coding sequence by one bit or a fraction of one bit and mixing the reflected data signal with the shifted receiver spread spectrum code; and
repeating the detecting, shifting, and mixing until the receiver spread spectrum code correlates to the spread spectrum code associated with the first transmitter and the reflected data signal is successfully de-spread;
identifying the first transmitter based on the correlation of the receiver spread spectrum code that successfully de-spread the reflected data signal to the spread spectrum code associated with the first transmitter;
for a second transmitter from the plurality of transmitters, repeating the steps of receiving an incident radio signal, receiving a reflected data signal from the wireless communication device, recovering the reflected data signal, and identifying the second transmitter; and
determining a location of the wireless communication device by:
determining a time delay between the reflected data signal and the incident radio signal for each of the first and second transmitters from the plurality of transmitters; and
using triangulation, identifying the location of the wireless communication device based on the determined time delays and the stored information indicating the physical location of each of the identified first and second transmitters.

16. The method of claim 15, further comprising removing the modulation from the reflected data signal to form data.

17. The method of claim 16, wherein said removing the modulation comprises mixing the incident radio signal with the reflected data signal.

18. The method of claim 16, wherein said removing the modulation comprises demodulating the modulation from the reflected data signal.

19. The method of claim 15, further comprising determining a distance between the wireless communication device and the transmitter that transmitted the incident radio signal based on a time delay between the received incident radio signal and the received reflected data signal.

20. The method of claim 19, further comprising determining an approximate location of the wireless communication device based on the determined distance between the wireless communication device and the transmitter and a known location of the transmitter.

21. A receiving device comprising:
a receiver configured to receive both an incident radio signal from a first transmitter of a plurality of transmitters and a reflected data signal from a wireless communication device, wherein the incident radio signal has been spread with a spread spectrum code that is associated with the first transmitter, and wherein the reflected data signal has been formed from reflective modulation of the incident radio signal with a data signal having a modulation; and
a mixer configured to mix one or more receiver spread spectrum codes in a spread spectrum coding sequence with the reflected data signal to identify a receiver spread spectrum code that correlates to the spread spectrum code associated with the first transmitter and successfully de-spreads the reflected data signal,
wherein the receiving device is configured to:
store, in a receiving device memory, the spread spectrum coding sequence which contains a plurality of receiver spread spectrum codes that respectively correlate to spread spectrum codes that are each associated with a transmitter from the plurality of transmitters;
store, in the receiving device memory, information indicating a physical location of each transmitter; and
recover the reflected data signal by:
detecting whether the reflected data signal was successfully de-spread during the mixing process using the receiver spread spectrum code;
if the reflected data signal was not successfully de-spread, shifting the receiver spread spectrum code in the spread spectrum coding sequence by one bit or a fraction of one bit and mixing the reflected data signal with the shifted receiver spread spectrum code;
repeating the detecting, shifting, and mixing until the receiver spread spectrum code correlates to the spread spectrum code associated with the first transmitter and the reflected data signal is successfully de-spread;
identify the first transmitter based on the correlation of the receiver spread spectrum code that successfully de-spread the reflected data signal to the spread spectrum code associated with the first transmitter;
for a second transmitter from the plurality of transmitters, repeat the steps of receiving an incident radio signal, receiving a reflected data signal from the wireless communication device, mixing the one or more receiver spread spectrum codes in the spread spectrum coding sequence with the reflected data signal, recovering the reflected data signal, and identifying the second transmitter; and
determine a location of the wireless communication device by:
determining a time delay between the reflected data signal and the incident radio signal for each of the first and second transmitters from the plurality of transmitters; and
using triangulation, identifying the location of the wireless communication device based on the determined time delays and the stored information indicating the physical location of each of the identified first and second transmitters.

22. The receiving device of claim 21, further comprising a demodulator configured to demodulate the modulation from the data signal to form data.

23. The receiving device of claim 21, wherein the receiver is further configured to remove the modulation from the data signal to form data.

24. The receiving device of claim 21, wherein the receiver is further configured to determine a distance between the wireless communication device and the transmitter that transmitted the incident radio signal based on a time delay between the received incident radio signal and the received reflected data signal.

25. The receiving device of claim 24, wherein the receiver is further configured to determine an approximate location of the wireless communication device based on a known location of the transmitter and the determined distance between the wireless communication device and the transmitter.

26. A reflective communication system, comprising:
communication means for receiving, from a first transmitter of a plurality of transmitters, an incident radio signal mixed with a spread spectrum code associated with the first transmitter and reflectively modulating the incident radio signal with a data signal having a modulation to form a reflected data signal; and
receiver means for receiving the incident radio signal and the reflected data signal and determining a location of the communication means,
wherein the receiver means is further configured to correlate a receiver spread spectrum code from a spread spectrum coding sequence to the spread spectrum code associated with the first transmitter by mixing the receiver spread spectrum code with the reflected data signal to recover the reflected data signal in a de-spread format, wherein the spread spectrum coding sequence is generated from a shift register of a defined number of bits which are combined in a logic function and fed back into the shift register input, and
wherein the receiver means is further configured to:
store, in a receiver means memory, the spread spectrum coding sequence which contains a plurality of receiver spread spectrum codes that respectively correlate to spread spectrum codes that are each associated with a transmitter from the plurality of transmitters;
store, in the receiver means memory, information indicating a physical location of each transmitter; and
recover the reflected data signal by:
detecting whether the reflected data signal was successfully de-spread during the mixing process using the receiver spread spectrum code;
if the reflected data signal was not de-spread, shifting the receiver spread spectrum code in the spread spectrum coding sequence by one bit or a fraction of one bit and mixing the reflected data signal with the shifted receiver spread spectrum code; and
repeating the detecting, shifting, and mixing until the receiver spread spectrum code correlates to the spread spectrum code associated with the first transmitter and the reflected data signal is successfully de-spread;
identify the first transmitter based on the correlation of the receiver spread spectrum code that successfully de-spread the reflected data signal to the spread spectrum code associated with the first transmitter;
for a second transmitter from the plurality of transmitters, repeat the steps of receiving an incident radio signal, receiving a reflected data signal from the communication means, mixing the receiver spread spectrum code with the reflected data signal, recovering the reflected data signal, and identifying the second transmitter; and
determine the location of the communication means by:
determining a time delay between the reflected data signal and the incident radio signal for each of the first and second transmitters from the plurality of transmitters; and
using triangulation, identifying the location of the communication means based on the determined time delays and the stored information indicating the physical location of each of the identified first and second transmitters.

27. The system of claim 26, wherein the receiver means is further configured to determine the location of the wireless communication device based on a known location of the transmitter and the determined distance between the wireless communication device and the transmitter.

28. A receiving device comprising:
receiver means for receiving both an incident radio signal from a first transmitter of a plurality of transmitters and a reflected data signal from a wireless communication device, wherein the incident radio signal has been spread with a spread spectrum code that is associated with the first transmitter, and wherein the reflected data signal has been formed from reflective modulation of the incident radio signal with a data signal having a modulation; and
mixer means for mixing one or more receiver spread spectrum codes in a spread spectrum coding sequence with the reflected data signal to identify a receiver spread spectrum code that correlates to the spread spectrum code associated with the first transmitter and successfully de-spreads the reflected data signal,
wherein the receiving device is configured to:
store, in a receiving device memory, the spread spectrum coding sequence which contains a plurality of receiver spread spectrum codes that respectively correlate to spread spectrum codes that are each associated with a transmitter from the plurality of transmitters;
store, in the receiving device memory, information indicating a physical location of each transmitter; and
recover the reflected data signal by:
detecting whether the reflected data signal was successfully de-spread during the mixing process using the receiver spread spectrum code;
if the reflected data signal was not successfully de-spread, shifting the receiver spread spectrum code in the spread spectrum coding sequence by one bit or a fraction of one bit and mixing the reflected data signal with the shifted receiver spread spectrum code; and
repeating the detecting, shifting, and mixing until the receiver spread spectrum code correlates to the spread spectrum code associated with the first transmitter and the reflected data signal is successfully de-spread; and
wherein the receiving device is further configured to:
identify the first transmitter based on the correlation of the receiver spread spectrum code that successfully de-spread the reflected data signal to the spread spectrum code associated with the first transmitter;
for a second transmitter of the plurality of transmitters, repeat the steps of receiving an incident radio signal, receiving a reflected data signal from the wireless communication device, mixing the one or more receiver spread spectrum codes in the spread spectrum coding sequence with the reflected data signal, recovering the reflected data signal, and identifying the second transmitter; and
determine a location of the wireless communication device by:
determining a time delay between the reflected data signal and the incident radio signal for each of the first and second transmitters from the plurality of transmitters; and
using triangulation, identifying the location of the wireless communication device based on the determined time delays and the stored information indicating the physical location of each of the identified first and second transmitters.

29. The receiving device of claim 28, wherein the receiver means is further configured to determine a distance between the wireless communication device and the transmitter that transmitted the incident radio signal based on a time delay between the received incident radio signal and the received reflected data signal.

30. The receiving device of claim 29, wherein the receiver means is further configured to determine an approximate location of the wireless communication device based on a known location of the transmitter and the determined distance between the wireless communication device and the transmitter.

31. A reflective communication system, comprising:
a plurality of transmitters, wherein each transmitter has a different spread spectrum code associated therewith that is mixed with an incident radio signal;
a wireless communication device configured to receive, from a first transmitter of the plurality of transmitters, an incident radio signal mixed with a spread spectrum code associated with the first transmitter and reflectively emit a reflected data signal based on the incident radio signal; and
a receiver configured to:
store, in a receiver memory, a spread spectrum coding sequence containing a plurality of receiver spread spectrum codes that each respectively correlate to the different spread spectrum code associated with each transmitter from the plurality of transmitters;
store, in the receiver memory, information indicating a physical location of each transmitter;
receive the incident radio signal and the reflected data signal; and
recover the reflected data signal received from the wireless communication device by:
mixing the reflected data signal with a receiver spread spectrum code;
detecting whether the reflected data signal was successfully de-spread during the mixing process using the receiver spread spectrum code;
if the reflected data signal was not successfully de-spread, shifting the receiver spread spectrum code in the spread spectrum coding sequence by one bit or a fraction of one bit and mixing the reflected data signal with the shifted receiver spread spectrum code; and
repeating the detecting, shifting, and mixing until the receiver spread spectrum code correlates to the spread spectrum code associated with the first transmitter and the reflected data signal is successfully de-spread;
identify the first transmitter based on the correlation of the receiver spread spectrum code that successfully de-spread the reflected data signal to the spread spectrum code associated with the first transmitter;
for a second transmitter from the plurality of transmitters, repeat the steps of receiving an incident radio signal, receiving a reflected data signal from the wireless communication device, recovering the reflected data signal, and identifying the second transmitter; and
determine a location of the wireless communication device by:
determining a time delay between the reflected data signal and the incident radio signal for each of the first and second transmitters from the plurality of transmitters; and
using triangulation, identifying the location of the wireless communication device based on the determined time delays and the stored information indicating the physical location of each of the identified first and second transmitters.

32. The system of claim 31, wherein the receiver is further configured to identify the transmitter from other transmitters in the plurality of transmitters based on the association of the transmitter with the identified receiver spread spectrum code.

33. The system of claim 32, wherein the different spread spectrum codes used by the plurality of transmitters have a low cross-correlation index.

34. The system of claim 31, wherein the receiver is further configured to determine a distance between the wireless communication device and the transmitter that transmitted the incident radio signal based on a time delay between the received incident radio signal and the received reflected data signal.

35. The system of claim 34, wherein the receiver is further configured to determine an approximate location of the wireless communication device based on a known location of the transmitter and the determined distance between the wireless communication device and the transmitter.

* * * * *